United States Patent Office 2,748,162
Patented May 29, 1956

2,748,162

PREPARATION OF PHTHALALDEHYDIC ACID FROM PENTACHLOROXYLENE

James D. Head and Owen D. Ivins, Midland, Mich., assignors to The Dow Chemical Company, Midland, Mich., a corporation of Delaware No Drawing. Application March 31, 1952,
Serial No. 279,682

9 Claims. (Cl. 260—515)

This invention relates to the preparation of phthalaldehydic acid from pentachloro-ortho-xylene. It pertains especially to an improved method for hydrolyzing the pentachloro-ortho-xylene having the formula:

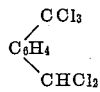

to form phthalaldehydic acid. The invention also concerns the preparation of aqueous solutions containing such acid and relates to further treatment of the solutions.

Phthalaldehydic acid and a method of making the same by hydrolysis of chlorophthalide are described in United States Patent No. 2,047,946. The side-chain chlorination of ortho-xylene to form the pentachloro derivative having the above-mentioned formula is known. Colson and Gautier, Annales de chimie et de physique, Series 6, vol. 11, pages 26–30 (1887), describe the pentachloro-ortho-xylene and obtained phthalaldehydic acid by hydrolysis of the compound in an aqueous medium. Attempts to hydrolyze the pentachloro-ortho-xylene by heating the same in admixture with water or an aqueous solution of hydrochloric acid demonstrates that the hydrolysis proceeds quite slowly. Hydrolysis of the pentachloro-ortho-xylene with water, or an aqueous solution of hydrochloric acid, requires heating of the compound in admixture with such aqueous medium for a period of several days, e. g., for from three to four days or longer, at a reflux temperature in order to complete the hydrolysis reaction. Hydrolysis of the pentachloro-ortho-xylene to form phthalaldehydic acid cannot conveniently be carried out in an alkaline aqueous medium, since the aldehydic nature of the product results in the formation of condensation by-products, or in the formation of colored substances, which are difficultly separable from the phthalaldehydic acid product.

It is an object of the invention to provide an improved method for carrying out the hydrolysis of a pentachloro-ortho-xylene having the formula:

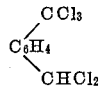

to form phthalaldehydic acid. Another object is to hydrolyze pentachloro-ortho-xylene in an aqueous medium containing a metal halide, as catalyst, to form phthalaldehydic acid. Still another object is to provide a method for carrying out the hydrolysis of a pentachloro-ortho-xylene having the aforementioned formula in the presence of an acidic medium and a metal halide as a catalyst. A further object is to provide a catalyst for promoting the hydrolysis of pentachloro-ortho-xylene to form phthalaldehydic acid in an acidic medium. A still further object is to prepare aqueous solutions containing phthalaldehydic acid or a salt thereof. Other and related objects will become apparent from the following description of the invention.

According to the invention, a pentachloro-ortho-xylene having the aforementioned formula can readily be hydrolyzed to form phthalaldehydic acid by heating the pentachloro-ortho-xylene in admixture with an aqueous solution containing a metal halide, more specifically hereinafter defined, as a catalyst for the reaction.

By hydrolyzing the pentachloro-ortho-xylene having the aforementioned formula in admixture with an aqueous solution containing a chloride or bromide of iron, zinc, or cadmium, or in admixture with an aqueous solution of a hydrohalic acid such as hydrochloric acid, or hydrobromic acid, and a chloride or bromide of such metals, the reaction proceeds at a substantially faster rate than is obtained in the absence of the metal halide under otherwise similar reaction conditions. Examples of suitable metal halides are zinc chloride, zinc bromide, ferric chloride, ferric bromide, cadmium chloride, and cadmium bromide. Mixtures of any two or more of the metal halides may also be used. The metal halide is used in amount corresponding to from 4 to 35 per cent, preferably from 10 to 20 per cent, by weight of the solution.

Since hydrochloric acid is formed in the reaction, the hydrolysis may advantageously be carried out employing an aqueous solution of a hydrohalic acid such as hydrochloric acid or hydrobromic acid and a metal halide, e. g. zinc chloride, as the hydrolysis medium. The hydrolysis occurs at a somewhat faster rate when initiated by, and carried out in, an aqueous solution of hydrochloric acid or hydrobromic acid containing a metal halide of the group previously mentioned, than when the hydrolysis is initiated in the absence of such acidic aqueous starting medium. The aqueous starting medium preferably contains 10 per cent by weight or more of the hydrohalic acid, together with the metal halide.

The aqueous medium may be used in any desired proportion relative to the pentachloro-ortho-xylene used. For convenience, the aqueous solution containing the metal halide, e. g. zinc chloride, dissolved therein is used in amount of from 0.5 to 10 parts, preferably from 1 to 2 parts, by weight per part of the pentachloro-ortho-xylene employed.

The hydrolysis may be carried out by heating the pentachloro-ortho-xylene in admixture with an aqueous solution containing a suitable metal halide as catalyst for the reaction at temperatures between 90° and 250° C., preferably from 100° to 150° C. The hydrolysis is usually carried out by heating a mixture of the pentachloro-ortho-xylene and an aqueous solution containing the metal halide, e. g. an aqueous solution of hydrochloric acid and zinc chloride, under reflux, i. e. at temperatures of from 100 to 110° C. Excess hydrochloric acid formed in the reaction is vented from the reaction zone. The hydrolysis may be carried out under pressure by heating a mixture of the aqueous solution containing a metal halide as catalyst and the pentachloro-ortho-xylene at a reaction temperature in an autoclave or other pressure resistant vessel.

In practice, the pentachloro-ortho-xylene and an aqueous solution of one or more of the aforementioned metal halides, or an aqueous solution of a hydrohalic acid and such metal halide, e. g. an aqueous 36 weight per cent solution of hydrochloric acid containing 20 per cent by weight of zinc chloride, are mixed together in the desired proportions. The mixture is heated to 90° C. or above, under pressure, or to boiling under reflux until the reaction is substantially complete. The reaction is usually complete upon disappearance of the oil layer.

Upon completion of the hydrolysis, the phthalaldehydic acid may be recovered from the aqueous solution, in any usual ways, e. g. by cooling the solution to crystallize the phthalaldehydic acid and separating the crystalline product by filtering, or by extracting the phthalaldehydic acid with a water-immiscible organic solvent such as benzene, toluene, chlorobenzene, ethylene dichloride, carbon tetrachloride, or chloroform, and separating the solvent from the product.

The hydrolysis solution is usually diluted with water, e. g. an equal volume or more of water, prior to cooling the same to crystallize the phthalaldehydic acid in order to maintain the metal halide in solution. The phthalaldehydic acid may be recovered by alkalizing the acidic solution with an alkali such as sodium or potassium hydroxide, or the carbonates or bicarbonates of sodium or potassium, to precipitate the metal in the form of its hydroxide, or carbonate, separating the precipitate from the liquid, then acidifying the liquid or filtrate and cooling the latter to crystallize the phthalaldehydic acid. The crystalline product is separated from the liquid by filtering and is washed and dried. It may be further purified by recrystallization from a solvent such as benzene or water. The precipitate of the metal hydroxide or carbonate which is separated from the hydrolysis solution may be mixed with an aqueous solution of a hydrohalic acid and reused in succeeding reactions.

In a preferred practice of the invention, the pentachloro-ortho-xylene and an aqueous solution of one or more of the metal halides, together with hydrochloric acid, is heated to boiling under reflux until the hydrolysis is complete. The hydrolysis solution is cooled to crystallize the phthalaldehydic acid. The latter is separated from the liquid by filtering. The filtrate, i. e. the aqueous liquid containing the metal halide, together with hydrochloric acid, is employed as the hydrolysis medium in succeeding reactions. In such instance, wherein the hydrolysis mixture is saturated with respect to the hydrochloric acid, the excess hydrogen chloride formed in the reaction is withdrawn or vented from the reaction zone and is recovered.

Phthalaldehydic acid is an intermediate for preparing other chemical compounds. For instance, it may be reacted with hydrazine or a salt thereof, e. g. hydrazine hydrate or hydrazine sulfate, to form phthalazone. When the phthalaldehydic acid is employed for such purpose, it is not necessary that the phthalaldehydic acid be separated from the aqueous medium in which it is formed. The acidic hydrolysis solution containing the metal halide and the phthalaldehydic acid may be made alkaline by adding thereto an alkali such as sodium hydroxide, potassium hydroxide, sodium carbonate or potassium carbonate, suitably in amount sufficient to precipitate the metal in the form of its carbonate or hydroxide and bring the liquid to a pH value between 8 and 10. The precipitate is separated from the liquid, e. g. by filtering. The liquid portion of the hydrolysis solution containing the phthalaldehydic acid in the form of its alkali metal salt is treated with hydrazine, or a salt thereof, e. g. hydrazine hydrate or hydrazine sulfate, in amount at least chemically equivalent to the salt of the phthalaldehydic acid and reacted therewith to form phthalazone. The reaction to form phthalazone is usually carried out by neutralizing the alkaline solution, containing the salt of phthalaldehydic acid and the hydrazine with an acid, e. g. a dilute aqueous solution of hydrochloric acid, and heating the neutral solution at temperatures between 60° and 100° C. to complete the reaction. The solution is preferably maintained substantially neutral, i. e. at a pH value between 6 and 8 while carrying out the reaction to form phthalazone. The phthalazone is recovered by cooling the solution to room temperature or below to crystallize the same from the liquid. The phthalazone is separated in any usual way, e. g. by filtering, and is washed and dried.

The following examples illustrate ways in which the principle of the invention has been applied, but are not to be construed as limiting the invention.

*Example 1*

A charge of 100 grams (0.36 mole) of a pentachloro-ortho-xylene having the formula:

was mixed with 100 cc. of an aqueous 48 weight per cent solution of hydrobromic acid and 20 grams of zinc bromide. The mixture was heated to boiling, i. e. at a reflux temperature, for a period of 4 hours. The oil layer disappeared. The solution was diluted with 200 cc. of water and cooled to room temperature. A crystalline material separated from the liquid. The crystalline product was separated from the liquid by filtering and was washed with water. The product was recrystallized from water and was washed and dried. There was obtained 38 grams (0.25 mole) of phthalaldehydic acid as white crystals melting at 95°–98° C. The yield of phthalaldehydic acid was 70 per cent, based on the pentachloro-orthoxylene initially used.

*Example 2*

A charge of 100 grams (0.36 mole) of pentachloro-ortho-xylene as described in Example 1, was mixed with 100 cc. of an aqueous 36 weight per cent solution of hydrochloric acid and 20 grams of zinc chloride. The mixture was heated to boiling for a period of 18 hours. Excess hydrogen chloride was vented from the reaction zone. A clear solution was obtained. The solution was diluted with 200 cc. of water and was cooled to room temperature. A crystalline material separated from the liquid. The crystals were separated by filtering and were washed with water. The product was dissolved in 100 cc. of hot water and was recrystallized therefrom. There was obtained 50 grams (0.33 mole) of phthalaldehydic acid as white crystals melting at 93°–97° C. The yield was 92 per cent based on the pentachloro-ortho-xylene initially used.

*Example 3*

A charge of 100 grams (0.36 mole) of pentachloro-ortho-xylene similar to that used in Example 1, was mixed with a solution of 100 cc. of concentrated hydrochloric acid and 50 grams of ferric chloride. The mixture was heated at a reflux temperature over a period of 3.5 hours. The acidic solution was diluted with water to a volume of approximately 800 cc. and was filtered while hot. The filtrate was made alkaline by adding an aqueous 50 weight per cent solution of sodium hydroxide thereto until the solution had a pH value between 8 and 10. The iron was thereby precipitated as iron hydroxide. The mixture was filtered to separate the precipitate. The filtrate was a clear solution. Twenty-five grams of hydrazine hydrate was added to the filtrate and the solution was neutralized with a dilute aqueous solution of sulfuric acid. The solution was heated on a steam bath at temperatures between 80° and 90° C. over a period of 3 hours, then cooled to room temperature. A crystalline product separated from the liquid. The crystals were separated by filtering and were washed and dried. There was obtained 36 grams of phthalazone as nearly white crystals melting at 181°–185° C. The yield of phthalazone was 68.5 per cent based on the pentachloro-ortho-xylene initially used.

*Example 4*

A charge of 100 grams (0.36 mole) of pentachloro-ortho-xylene similar to that used in Example 1, was mixed with 100 cc. of an aqueous 36 weight per cent solution of hydrochloric acid and 5 grams of ferric chloride. The mixture was heated at a reflux temperature over a period of 8 hours. A clear solution was obtained. It was diluted with 200 cc. of water and cooled to room temperature. A crystalline material separated from the liquid. The crystals were separated by filtering and were washed with water. The product was recrystallized from water. There was obtained 34 grams (0.23 mole) of phthalaldehydic acid as white crystals melting at 97°–99° C. The yield of phthalaldehydic acid was 63 per cent based on the pentachloro-ortho-xylene initially used.

*Example 5*

A charge of 100 grams of the pentachloro-orthoxylene, described in Example 1, was mixed with 100 cc. of an aqueous 10 weight per cent solution of hydrochloric acid and 20 grams of ferric chloride. The mixture was heated at a reflux temperature over a period of 5 hours. A clear solution was obtained. It was diluted with 200 cc. of water and cooled to room temperature. A crystalline material separated from the liquid. The crystalline product was separated by filtering and was washed with water. The product was recrystallized from water. There was obtained phthalaldehydic acid as white crystals melting at 97°–99° C.

*Example 6*

A charge of 100 grams (0.36 mole) of pentachloro-ortho-xylene similar to that used in Example 1, was mixed with a solution of 100 cc. of water and 20 grams of zinc chloride. The mixture was heated at a reflux temperature over a period of 36 hours. The oil layer disappeared. The solution was diluted with 200 cc. of water and was cooled to room temperature. A crystalline material separated from the liquid. The crystals were separated by filtering and were washed with water. The product was recrystallized from water. There was obtained 48 grams (0.32 mole) of phthalaldehydic acid as white crystals melting at 92°–95° C. The yield of phthalaldehydic acid was 89 per cent, based on the pentachloro-ortho-xylene initially used.

*Example 7*

A charge of 100 grams of pentachloro-ortho-xylene similar to that used in Example 1, was mixed with 100 cc. of an aqueous 36 weight per cent solution of hydrochloric acid and 10 grams of zinc chloride. The mixture was heated at a reflux temperature over a period of 15 hours. A clear solution was obtained. It was diluted with 200 cc. of water and cooled to room temperature. A crystalline material separated from the liquid. The crystals were separated by filtering and were washed with water and dried. There was obtained 36 grams (0.24 mole) of phthalaldehydic acid as white crystals melting at 94°–96° C.

*Example 8*

A charge of 100 grams (0.36 mole) of pentachloro-ortho-xylene similar to that used in Example 1, was mixed with 100 cc. of an aqueous 36 weight per cent solution of hydrochloric acid and 20 grams of cadmium chloride. The mixture was heated at a reflux temperature over a period of 40 hours. A clear solution was obtained. It was diluted with 200 cc. of water and was cooled to room temperature. A crystalline material separated from the liquid. The crystals were separated by filtering and were recrystallized from water. There was obtained 41 grams (0.27 mole) of phthalaldehydic acid as white crystals melting at 95°–97° C. The yield of phthalaldehydic acid was 75 per cent based on the pentachloro-ortho-xylene initially used.

*Example 9*

A charge of 100 grams of pentachloro-ortho-xylene as described in Example 1, was mixed with 100 cc. of an aqueous 36 weight per cent solution of hydrochloric acid and 20 grams of zinc chloride. The mixture was heated at a reflux temperature until the oil layer disappeared. The solution was diluted with approximately 300 cc. of water and was made alkaline by adding an aqueous 50 weight per cent solution of sodium hydroxide thereto until the solution had a pH value between 8 and 10. The zinc was precipitated as its hydroxide. The precipitate was separated by filtering. There was obtained a clear solution containing the alkali metal salt of phthalaldehydic acid. Eighty grams of hydrazine sulfate were dissolved in the liquid. The alkaline solution was neutralized with dilute sulfuric acid. The neutral solution was heated at a temperature of 80° C. for two hours, then cooled. A crystalline product separated from the liquid. The product was separated by filtering and was washed with water and dried at temperatures between 80° and 100° C. There was obtained 50 grams (0.34 mole) of phthalazone as nearly white crystals melting at 181°–185° C. The yield of phthalazone was 97 per cent based on the pentachloro-ortho-xylene initially used.

*Example 10*

A charge of 100 grams (0.36 mole) of pentachloro-ortho-xylene similar to that described in Example 1, together with 500 cc. of water, 10 cc. of aqueous 36 weight per cent solution of hydrochloric acid and 250 grams of zinc chloride, was heated at temperatures between 240° and 250° C. in a tantalum lined pressure resistant vessel for a period of 15 minutes, then cooled. The hydrolysis mixture was removed from the vessel and was diluted with 500 cc. of water. The mixture was made alkaline with an aqueous 30 weight per cent solution of sodium hydroxide. The zinc was precipitated as its hydroxide. The mixture was filtered to separate the precipitate from the liquid. Twenty cubic centimeters of hydrazine hydrate was added to the filtrate and the solution was made neutral with a dilute aqueous solution of hydrochloric acid. The neutral solution was heated at temperatures between 80° and 90° C. on a steam bath over a period of 2.5 hours. The solution was cooled, in an ice bath. A crystalline product separated from the liquid. The product was separated by filtering and was washed and dried. There was obtained 12 grams (0.08 mole) of phthalazone as white crystals melting at 184°–187° C. The yield of phthalazone was 22 per cent based on the pentachloro-ortho-xylene initially used.

*Example 11*

A charge of 100 grams (0.36 mole) of a pentachloro-ortho-xylene similar to that described in Example 1, together with 100 cc. of an aqueous 18 weight per cent solution of hydrochloric acid and 20 grams of zinc chloride was placed in a glass reaction flask equipped with a reflux condenser. The mixture was heated at its boiling temperature over a period of 18 hours. A clear solution was obtained. Hydrogen chloride formed in the reaction was vented through the reflux condenser and was absorbed in an aqueous 10 weight per cent solution of sodium hydroxide. The hydrolysis solution was cooled to room temperature to crystallize the phthalaldehydic acid. The crystalline product was separated by filtering and was washed with 100 cc. of water and was dried. There was obtained 50 grams (0.33 mole) of phthalaldehydic acid as white crystals melting at 92°–96° C. The yield of phthalaldehydic acid was 92 per cent based on the pentachloro-ortho-xylene initially used. The alkali solution was analyzed and found to contain chloride in amount corresponding to 95 per cent of the chemically equivalent amount of the pentachloro-ortho-xylene initially used. The washings and filtrate were combined. The mixture was concentrated by evaporation of a portion of the water to leave a liquid residue containing the zinc chloride and having a volume of approximately 100 cc. The aqueous liquid residue was mixed with 100 grams of the aforementioned pentachloro-ortho-xylene. The mixture was heated at its reflux temperature over a reaction period of 18 hours. A clear solution was obtained. Hydrogen chloride formed in the reaction was vented through the reflux condenser and was absorbed in an aqueous 10 weight per cent solution of sodium hydroxide. The phthalaldehydic acid was recovered by cooling the hydrolysis solution and separating the crystalline product. The yield of phthalaldehydic acid was nearly quantitative. Hydrogen chloride in amount corresponding to 97 per cent of the chemical equivalent of the pentachloro-ortho-xylene initally used was separated from the reaction and was absorbed in the aqueous sodium hydroxide solution. The hydrolysis was carried out employing the aqueous zinc chloride solution in each of a series of four experiments. No loss in catalytic activity of the zinc chloride solution was observed. The overall yield of phthalaldehydic acid was nearly quantitative, based on the total pentachloro-ortho-xylene starting material. Recovery of the hydrogen chloride was substantially quantitative.

Other modes of applying the principle of the invention may be employed instead of those explained, change being made as regards the steps or compounds herein employed, provided the steps or compounds stated in any of the following claims or the equivalent of such steps or compounds be employed.

We claim:

1. A method of forming phthalaldehydic acid which comprises hydrolyzing a pentachloro-ortho-xylene, having the formula:

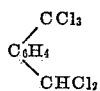

in admixture with an aqueous solution containing at least 10 per cent by weight of a hydrohalic acid selected from the group consisting of hydrochloric acid and hydrobromic acid, and from 4 to 35 per cent by weight of at least on metal halide selected from the group consisting of zinc chloride, zinc bromide, ferric chloride, ferric bromide, cadmium chloride and cadmium bromide, by heating a mixture of the ingredients at a reaction temperature between 90° and 250° C.

2. A method of forming an aqueous solution containing an alkali metal salt of phthalaldehydic acid which comprises hydrolyzing a pentachloro-ortho-xylene, having the formula:

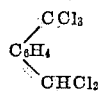

in admixture with an aqueous solution containing at least 10 per cent by weight of a hydrohalic acid selected from the group consisting of hydrochloric acid and hydrobromic acid, and from 4 to 35 per cent by weight of at least one metal halide selected from the group consisting of zinc chloride, zinc bromide, ferric chloride, ferric bromide, cadmium chloride and cadmium bromide by heating a mixture of the ingredients at a reaction temperature between 90° and 250° C., neutralizing the solution with an alkali which is a member of the group consisting of sodium hydroxide, potassium hydroxide, sodium carbonate and potassium carbonate, whereby the metal halide is converted to a corresponding derivative and precipitates, and separating the precipitate from the liquid.

3. A method of making phthalaldehydic acid which comprises hydrolyzing a pentachloro-ortho-xylene having the formula:

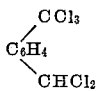

in admixture with an aqueous solution containing at least 10 per cent by weight of hydrochloric acid and containing from 4 to 35 per cent by weight of at least one metal halide selected from the group consisting of zinc chloride, zinc bromide, ferric chloride, ferric bromide, cadmium chloride, and cadmium bromide, by heating the mixture to boiling under reflux and withdrawing excess hydrogen chloride from the reaction zone as it is formed, then cooling the mixture to crystallize the phthalaldehydic acid from the liquid, separating the crystalline product from the liquid and reusing the liquid as the hydrolysis medium in a succeeding reaction.

4. A method of making phthalaldehydic acid which comprises hydrolyzing a pentachloro-ortho-xylene having the formula:

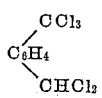

in admixture with an aqueous solution containing at least 10 per cent by weight of a hydrohalic acid selected from the group consisting of hydrochloric acid and hydrobromic acid, and from 4 to 35 per cent by weight of at least one metal halide selected from the group consisting of zinc chloride, zinc bromide, ferric chloride, ferric bromide, cadmium chloride, and cadmium bromide, by heating a mixture of the ingredients at a reaction temperature between 100° and 150° C. and separating phthalaldehydic acid from the hydrolysis solution.

5. A process, as described in claim 4, wherein the aqueous solution contains from 4 to 35 per cent by weight of zinc chloride.

6. A process, as described in claim 4, wherein the aqueous solution contains from 4 to 35 per cent by weight of zinc bromide.

7. A process, as described in claim 4, wherein the aqueous solution contains from 4 to 35 per cent by weight of ferric chloride and at least 10 per cent by weight of hydrogen chloride.

8. A process, as described in claim 4, wherein the aqueous solution contains from 4 to 35 per cent by weight of cadmium chloride and at least 10 per cent by weight of hydrogen chloride.

9. A process, as described in claim 4, wherein the aqueous solution contains from 4 to 35 per cent by weight of zinc bromide and at least 10 per cent by weight of hydrogen bromide.

References Cited in the file of this patent

UNITED STATES PATENTS 2,398,430  Joyce _____ Apr. 16, 1946

FOREIGN PATENTS 13,127  Germany _____ May 25, 1880
85,439  Germany _____ Sept. 10, 1895

OTHER REFERENCES

Gabriel et al.: Ber. Deut. Chem. 26, 523 (1893).
Liebermann: Ber. Deut. Chem. 26, 535 (1893).